United States Patent [19]

Brinjevec

[11] 4,047,385
[45] Sept. 13, 1977

[54] SOLAR TO ELECTRICAL ENERGY CONVERTING SYSTEM

[76] Inventor: Heinz J. Brinjevec, 3990 Riberdy Road, Windsor, Ontario, Canada

[21] Appl. No.: 725,251

[22] Filed: Sept. 21, 1976

[30] Foreign Application Priority Data

Sept. 25, 1975 Canada .................................... 236413

[51] Int. Cl.² .............................................. F01K 7/02
[52] U.S. Cl. ...................................... 60/641; 126/271
[58] Field of Search ................... 60/641; 126/270, 271

[56] References Cited

U.S. PATENT DOCUMENTS

| 2,460,482 | 2/1949 | Abbot | 126/271 |
| 3,152,442 | 10/1964 | Rowekamp | 126/271 X |
| 3,390,672 | 7/1968 | Snelling | 126/271 |
| 3,901,036 | 8/1975 | Martin | 126/270 X |

*Primary Examiner*—Allen M. Ostrager
*Attorney, Agent, or Firm*—Charles Krassov

[57] ABSTRACT

This energy system comprises a metal sphere equipped on the outside thereof with two centrally located arc-shaped and pivoted arms which meet on the top of the sphere and are joined by means of a spring loaded connection. Each of said arms consists of a bank of spaced convex lenses which focus the rays of the sun into intensely hot focal points on the surface of the sphere. Inside, the sphere are coils of pipe containing water which is converted to steam by means of a heating liquid in which these pipes are immersed, so that the heating liquid which is heated by the surface of the sphere, in turn heats the coiled pipe changing the contained water to steam. The steam is fed to an engine or turbine which in turn powers a dynamo which supplies electrical power. The heating fluid inside the sphere also circulates through a furnace which takes over the heating of the liquid during the absence of the sun's rays. Heat sensing devices spread the arms from the sphere when it becomes overheated beyond a predetermined temperature. In addition the system is provided with the usual control valves, thermostats, and a heat exchanger.

3 Claims, 2 Drawing Figures

U.S. Patent  Sept. 13, 1977  4,047,385

SOLAR TO ELECTRICAL ENERGY CONVERTING SYSTEM

This invention relates to a system and apparatus for converting solar energy into electrical energy through the medium of heat.

Its primary object is to provide an inexhaustible supply of energy at a comparatively low cost.

Another object is to provide a novel, practically effective, and simply controlable system of collecting and utilizing the heat rays emanating from the sun.

The above is accomplished by passing the rays of the sun through a system of lenses which converge these rays into focal points of high heat intensity, the sun of which is used to convert water to steam which powers a dynamo for the manufacture of electrical power.

Figure 1:
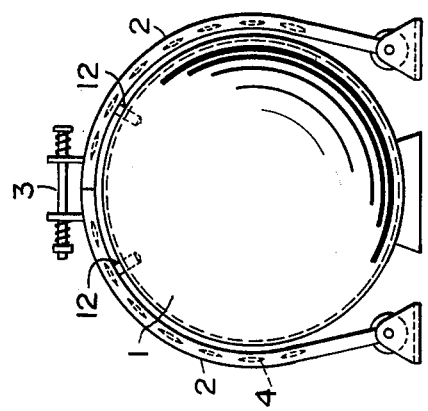
Figure 2:
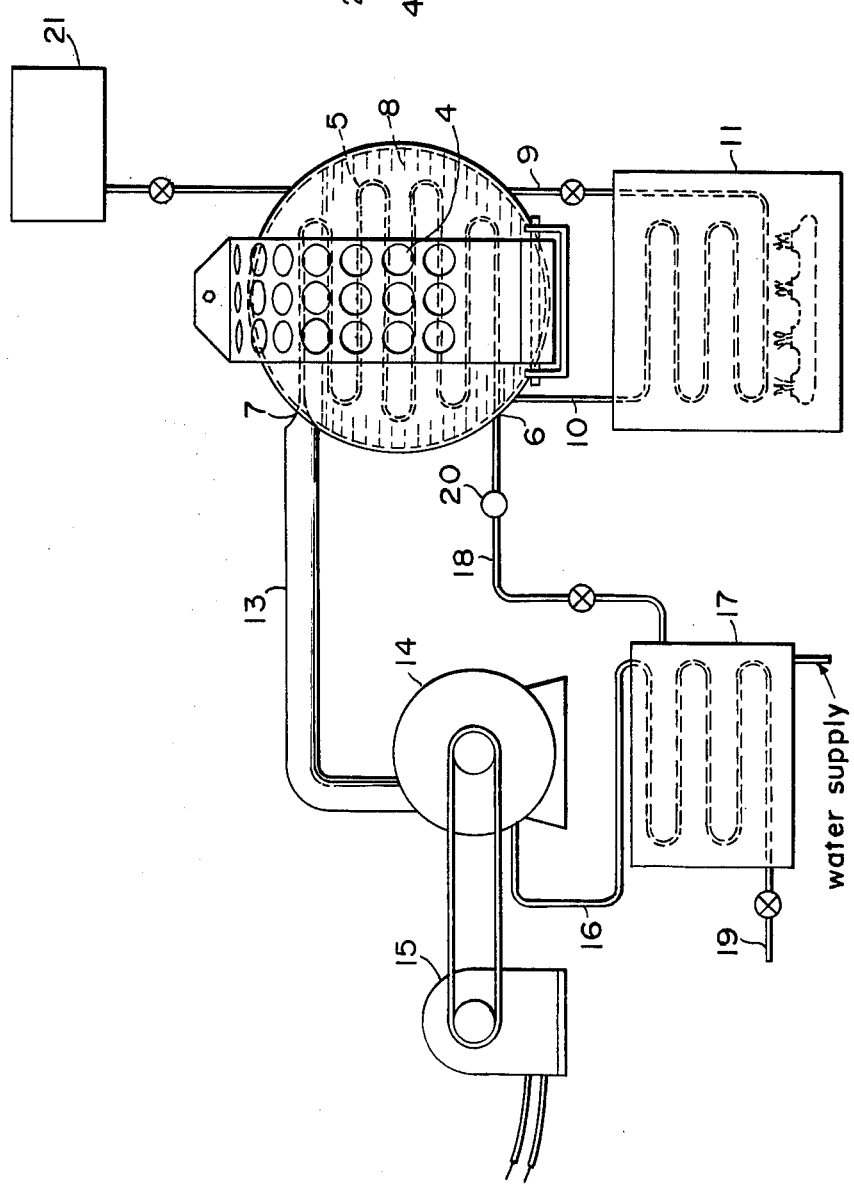

In describing the invention reference will be made to the attached drawing in which, FIG. 1 shows a front elevation of the solar heating unit, and FIG. 2 shows an end view of the solar heating unit plus a diagrammatic arrangement of related equipment.

The solar heating unit consists of a heavy metal sphere 1 to the outside and lower part of which are pivotally attached two centrally located, oposite, arc-shaped arms 2,2, which meet at the top of the sphere 1 and are joined togeher by a spring loaded connection 3.

Each of the arms 2,2, consists of a plate holding a bank of convex lenses 4. The arms 2,2, are spaced from the surface of the sphere 1 at a distance exactly equal to the focal length of the lenses so that when the sun's rays pass through the lenses, the focal points are in contact with the surface of the sphere 1.

Inside the sphere 1 is located a steam coil 5 of continous piping with an intake 6 and an outlet 7 extending to the outside of said sphere. The steam coil 5 contains water which is converted to steam; it does not come in direct contact with the sphere, but is heated by means of and intermediate heating fluid 8 contained in the sphere 1, in which the coil 5 is immersed. Several different fluids, used for such purposes, having a much higher boiling point than water, are now available upon the market. These fluids will provide sufficient heat to convert the water to steam without themselves vaporizing.

An inlet 9 and an outlet 10 of the sphere 1, are connected to a furnace 11 allowing the fluid 8 to circulate in and through said furnaces, so that when the sun's rays are not available, as on a cloudy day or during the night, a standard thermostatic switch located within said liquid 8, turns the furnace on to heat and the liquid 8 to the required temperature, to produce steam in the coil 5, so that the operation of the system is not interrupted until the sun's rays are again available.

To prevent overheating of the sphere 1, and consequently the contained heating fluid 8, to a temperature beyond that necessary to produce steam, the sphere is provided with a pair of rods 12,12, one under each of the arms 2,2. The part of the rod 12 which is outside of the 1 makes contact with the underside of the arm 2, while the part of said rod which is inside of the sphere is immersed in the liquid 8. When the liquid 8 reaches a predetermined overheat temperature, the rod 12 expands in length to push the arm 2 and thereby slightly increase the distance between the arm 2 and the sphere 1. This removes the heat producing focal point from the surface of the sphere. When the heat of the liquid 8 drops to the required temperature, the rods 12,12, contract and, due to the spring loaded connection 3, the arms 2,2, return to their original position, and the heating rocess in resumed.

The steam produced in the sphere 1 is led through a pipe 13 to a steam turbine 14 which in turn operates a dynamo 15 to produce electricity.

The spent steam and hot water is led from the turbine discharge by means of a pipe 16 to the interior coils of a heat exchanger 17 thereby preheating the supply of cold water which passes through the heat exchanger 17 and continues on through the water pipe 18 to the steam coil 5 in the sphere 1. Condensate from the heat exchanger coil is discharged through an outlet 19 in the heat exchanger.

A thermostatic control lights up the furnace 11 when the temperature in the fluid 8 drops due to the absence of sun rays. The liquid 8 is thus heated until the sun's rays appear again whereupon the furnace 11 is shut off.

A one-way check valve prevents water from backing up into the cold water supply. Other control valves are installed where required for convenient operation and maintenance.

The shpere 1 and pipes leading to and from it can be insulated to help prevent heat losses, however, no insulation is used in the areas of the sphere which are in contact with the heat producing focal points.

A tank 21 contains a supply of the heating fluid 8, and is used for occasionally replenshing the fluid in the sphere.

Having described the invention, what I claim is,

1. Apparatus and method for converting solar energy to electricity through the medium of heat comprising in combination a heating unit which collects the rays of the sun by means of convex lenses, which converge these rays into heat producing focal points which come in contact with a metal container, said container having a heating liquid whose boiling point is considerably higher than that of water, therein; and a steam producing pipe coil immersed in said heating liquid; means for breaking contact between said focal points and said container for the purpose of controlling the heat in said container; a steam turbine which is powered by said steam producing coil; a dynamo for producing electrical power which is operated by said steam turbine, a source of water which feeds said steam coil; a heat exchanger which preheats the water entering said steam coil, said heat exchanger utilizing the spent steam from said turbine for preheating the water; a furnace for heating said heating fluid to a steam producing temperature when the rays of the sun are not available; a storage tank, which communicates with said heating container, which contains a supply of heating fluid for the purpose of replenshing said fluid as required; and standard temperature and liquid flow controls for proper operation.

2. A heating unit such as described in claim 1 comprising a totally enclosed spherical container which is equipped with two arc-shaped, opposite and centrally located pivotted arms on the outside thereof; the upper ends of said arms touching each other above the top of said sphere; a spring loaded connection which holds said arms together; a plurality of spaced convex lenses located within said arms, said arms being spaced from the surface of said sphere so that the focal points of said lenses come in precise contact with the surface of said sphere; and ametal sensing rod immersed in said heating fluid, extending to the outside of said sphere, and in contact with the underside of each of said arms so that when said heating fluid reaches a temperature above its predetermined maximum allowable temperature, the thermal expansion of said rods causes the said arms to spread thus removing the focal points of the lenses from the surface of the sphere; when the temperature of the heating fluid drops to the required level, the sensing rods contract as they cool, the spring loaded connection brings the arms together, and the heating process is resumed.

3. A heating unit such as described in claim 2 in which the said sphere is insulated on the outer surface thereof, except in the areas where the said focal points come in contact with the surface of the sphere.

* * * * *